(12) United States Patent (10) Patent No.: US 12,659,029 B2
Kawai et al. (45) Date of Patent: Jun. 16, 2026

(54) WAVEGUIDE ESTIMATION APPARATUS, WAVEGUIDE ESTIMATION METHOD AND PROGRAM

(71) Applicant: NTT, Inc., Tokyo (JP)

(72) Inventors: Akira Kawai, Musashino (JP);
Takayuki Kobayashi, Musashino (JP);
Masanori Nakamura, Musashino (JP);
Shimpei Shimizu, Musashino (JP);
Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 275 days.

(21) Appl. No.: 18/290,350

(22) PCT Filed: May 18, 2021

(86) PCT No.: PCT/JP2021/018833
§ 371 (c)(1),
(2) Date: Nov. 13, 2023

(87) PCT Pub. No.: WO2022/244111
PCT Pub. Date: Nov. 24, 2022

(65) Prior Publication Data
US 2024/0259095 A1 Aug. 1, 2024

(51) Int. Cl.
*H04B 10/079* (2013.01)
*H04B 10/61* (2013.01)

(52) U.S. Cl.
CPC ..... *H04B 10/0795* (2013.01); *H04B 10/6162* (2013.01)

(58) Field of Classification Search
None
See application file for complete search history.

(56) References Cited

U.S. PATENT DOCUMENTS 9,036,751 B1 * 5/2015 Wang .................... H04B 10/07
375/348
9,094,117 B1 7/2015 Wang et al.
(Continued)

FOREIGN PATENT DOCUMENTS

CN 108667521 A * 10/2018 ............. H04B 10/61

OTHER PUBLICATIONS

F.N. Hauske et al., "Optical Performance Monitoring in Digital Coherent Receivers", Journal of Lightwave Technology, vol. 27, No. 16, pp. 3623-3631, (2009).

*Primary Examiner* — Li Liu
(74) *Attorney, Agent, or Firm* — Harness, Dickey & Pierce, P.L.C.

(57) ABSTRACT

A waveguide estimation device includes: a time window processing unit that multiplies time-series tap coefficients of an adaptive filter by a time window function; and an estimation unit that estimates at least one of a differential group delay in a frequency series or a time series and a polarization dependent loss in a frequency series or a time series based on the time-series tap coefficients in a time window. The estimation unit may estimate at least one of the differential group delay in a frequency series or a time series and the polarization dependent loss in a frequency series or a time series based on a tap coefficient exceeding a lower limit threshold value or falling below an upper limit threshold value among the time-series tap coefficients in a time window. The estimation unit may estimate the average value of the differential group delays in a frequency series or a time series. The time window processing unit may determine the length of the time window based on a constant multiple of the average value.

6 Claims, 13 Drawing Sheets

(56)          References Cited

U.S. PATENT DOCUMENTS

| | | | | |
|---|---|---|---|---|
| 11,190,277 B1 * | 11/2021 | Nguyen | ............. | H04B 10/0799 |
| 11,239,929 B1 * | 2/2022 | Babaee | ................ | H04B 17/318 |
| 2018/0102839 A1 * | 4/2018 | Wang | ................ | H04L 25/03019 |

* cited by examiner

WAVEGUIDE ESTIMATION APPARATUS, WAVEGUIDE ESTIMATION METHOD AND PROGRAM

CROSS-REFERENCE TO RELATED APPLICATIONS

This application is a 371 U.S. National Phase of International Application No. PCT/JP2021/018833, filed on May 18, 2021. The entire disclosure of the above application is incorporated herein by reference.

TECHNICAL FIELD

The present invention relates to a waveguide estimation device, a waveguide estimation method, and a program.

BACKGROUND ART

With the development of information technologies, a total amount of data traffic has increased exponentially. In optical communication, an optical fiber is used as a waveguide in a transmission path of an optical signal and an optical device. An optical fiber is used for a fixed line in which a large transmission capacity is particularly required because attenuation of an optical signal is small and an available band is wide.

Factors that limit the transmission capacity for optical signals include polarization mode dispersion (PMD) and polarization dependent loss (PDL). Polarization mode dispersion means that a differential group delay occurs between polarization modes of an optical signal. The polarization dependent loss is a difference between a maximum value and a minimum value of the optical loss (insertion loss of the optical signal) depending on the polarization mode. Birefringence according to distortion generated in the optical fiber at the time of manufacturing an optical fiber and bending the optical fiber after manufacturing is the main cause of polarization mode dispersion and polarization dependent loss.

When an optical signal input to an optical fiber is output from the optical fiber, the polarization state of the output optical signal may fluctuate due to polarization mode dispersion. Here, when the polarization state of the optical signal input to the optical fiber is a specific state, the fluctuation of the polarization state of the optical signal output from the optical fiber is suppressed.

Such a specific state is called a principal state of polarization (PSP). In addition, the amount of distortion generated in the waveform of the optical signal due to the polarization mode dispersion is expressed by using a differential group delay (DGD) between polarization modes orthogonal to each other in the principal state of polarization.

Since the waveform of the optical signal is distorted according to the differential group delay and the polarization dependent loss, the differential group delay and the polarization dependent loss become factors of interference between symbols. Among them, the differential group delay randomly fluctuates at a high speed according to a temperature change and mechanical vibration of the waveguide (optical fiber). For this reason, the distortion due to the differential group delay is regarded as the largest factor that limits the transmission capacity for the optical signals.

However, in recent years, it has become possible to compensate for distortion according to polarization mode dispersion (differential group delay) and polarization dependent loss by realization of a communication technology called digital coherent communication. The digital coherent communication is a communication technology in which digital signal processing and coherent communication are combined. Coherent communication is a communication technology for deriving electric field information of an optical signal using an interference waveform between a received optical signal and local light.

In digital coherent communication, an impulse response of a transmission path between a transmitter and a receiver and a waveguide in an optical device is estimated using an adaptive filter. It is possible to estimate the differential group delay and the polarization dependent loss based on the estimated impulse response (refer to Non Patent Document 1).

By executing a convolution operation using an inverse of an impulse response (an inverse matrix of a transfer function) on an optical signal received by a receiver, compensation for distortion according to polarization mode dispersion (differential group delay) is possible. On the other hand, since the polarization dependent loss involves energy loss, it is not possible to completely compensate for the polarization dependent loss using digital signal processing.

In a case where the peak of the impulse response is long in the time direction and the distortion of the waveform of the optical signal is large, the number of taps of the adaptive filter (the number of samples of the input signal used for the convolution operation in the time direction) needs to be increased in advance. However, by increasing the number of taps, the operation amount and the power consumption amount of the digital signal processing increase. In addition, in a case where the distortion of the waveform becomes extremely large, even when the number of taps of the adaptive filter is increased in advance, the distortion compensation is not possible in some cases.

CITATION LIST

Non Patent Document

Non Patent Document 1: F. N. Hauske, M. Kuschnerov, B. Spinnler, and B. Lankl, "Optical Performance Monitoring in Digital Coherent Receivers," Journal of Lightwave Technology, vol. 27, No. 16, pp. 3623-3631 (2009)

SUMMARY OF INVENTION

Technical Problem

The tap coefficients of the adaptive filter are multiplied by a reception signal (digital signal) corresponding to the optical signal at the time of convolution operation. The Fourier transform result "$W(\omega)$" of the tap coefficients is expressed as Formula (1) as an inverse matrix (2×2 matrix) of the transfer function of the waveguide.

[Math. 1]

$$W(\omega) = \begin{bmatrix} h_{xx}(\omega) & h_{xy}(\omega) \\ h_{yx}(\omega) & h_{yy}(\omega) \end{bmatrix} \quad (1)$$

The differential group delay "$\tau_{estim}(\omega)$" is expressed by Formula (2).

[Math. 2]

$$\tau_{estim}(\omega) = \sqrt[2]{\frac{\det\left(\frac{dW(\omega)}{d\omega}\right)}{\det W(\omega)}}$$  (2)

The polarization dependent loss "$H_{PDL}(\omega)$" is expressed by Formula (3).

[Math. 3]

$$H_{PDL}(\omega) = \left|\sqrt{\det W(\omega)}\right|$$  (3)

Here, since dedicated hardware for estimating the differential group delay and the polarization dependent loss is unnecessary, the hardware of the digital coherent receiver does not need to be changed. In addition, it is possible to estimate the differential group delay and the polarization dependent loss in real time during transmission of the optical signal without degrading the transmission quality of the optical signal.

However, the signal-to-noise ratio of the optical signal may be less than a predetermined value due to a large number of times of relaying the optical signal, a high modulation speed, or the like. When the signal-to-noise ratio of the optical signal is less than the predetermined value, the estimation accuracy of the differential group delay and the polarization dependent loss decreases. As described above, when the signal-to-noise ratio of the optical signal transmitted through the waveguide is less than the predetermined value, there is a problem that the estimation accuracy of the differential group delay and the polarization dependent loss cannot be improved.

In view of the above circumstances, an object of the present invention is to provide a waveguide estimation device, a waveguide estimation method, and a program capable of improving estimation accuracy of at least one of a differential group delay and a polarization dependent loss even when a signal-to-noise ratio of an optical signal transmitted through a waveguide is less than a predetermined value.

Solution to Problem

According to an aspect of the present invention, there is provided a waveguide estimation device including: a time window processing unit that multiplies time-series tap coefficients of an adaptive filter by a time window function; and an estimation unit that estimates at least one of a differential group delay in a frequency series or a time series and a polarization dependent loss in a frequency series or a time series based on the time-series tap coefficients in a time window.

According to another aspect of the present invention, there is provided a waveguide estimation method executed by a waveguide estimation device, the method including: a time window processing step of multiplying time-series tap coefficients of an adaptive filter by a time window function; and an estimation step of estimating at least one of a differential group delay in a frequency series or a time series and a polarization dependent loss in a frequency series or a time series based on the time-series tap coefficients in a time window.

According to still another aspect of the present invention, there is provided a program for causing a computer to function as the above-described waveguide estimation device.

Advantageous Effects of Invention

According to the present invention, when the signal-to-noise ratio of the optical signal transmitted through the waveguide is less than the predetermined value, it is possible to improve the estimation accuracy of at least one of the differential group delay and the polarization dependent loss.

DESCRIPTION OF EMBODIMENTS

Embodiments of the present invention will be described in detail with reference to the drawings.

First Embodiment

Figure 1:
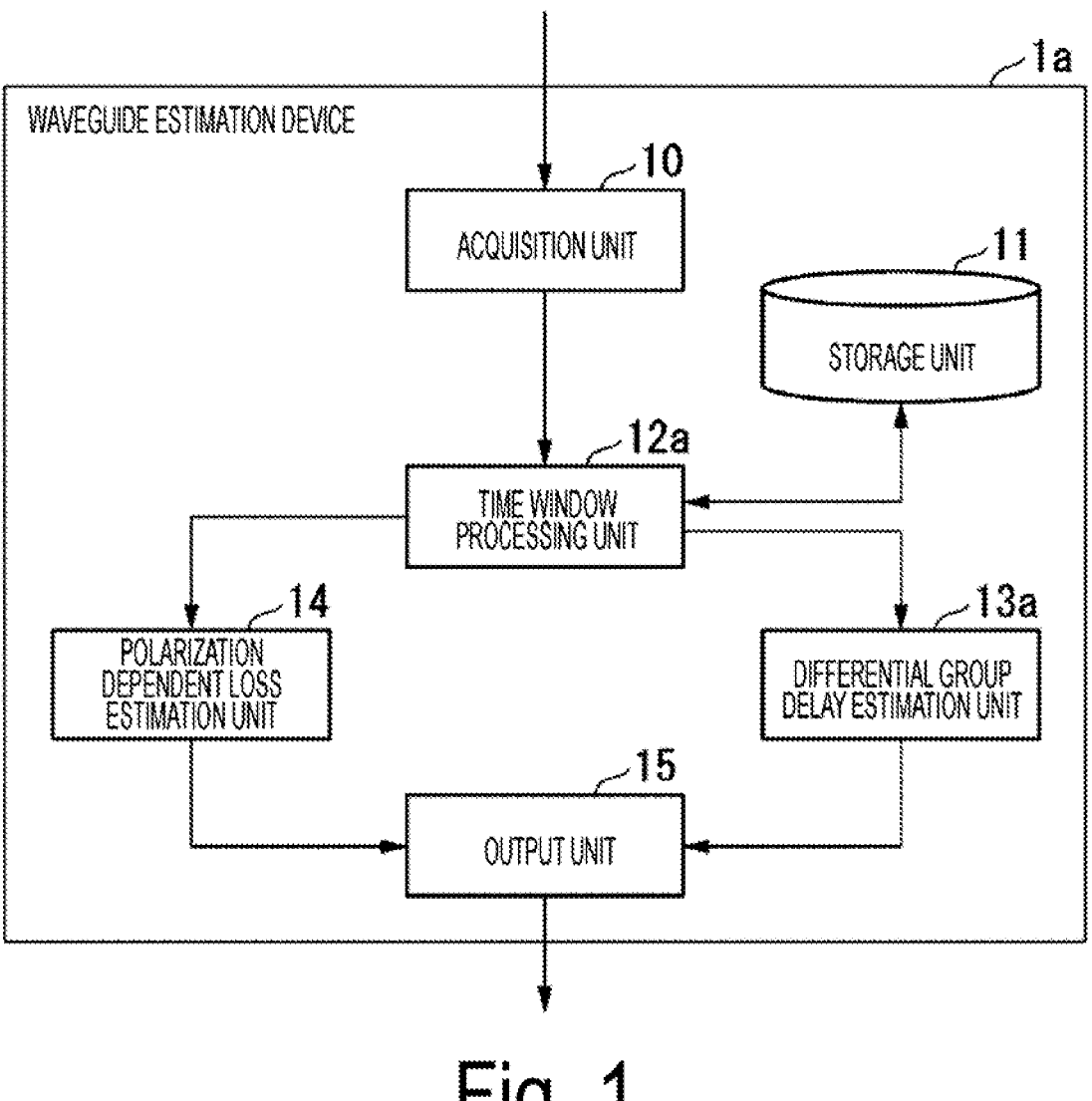
FIG. 1 is a diagram illustrating a configuration example of a waveguide estimation device according to a first embodiment.

FIG. 1 is a diagram illustrating a configuration example of a waveguide estimation device 1a (waveguide estimation apparatus) according to a first embodiment. The waveguide estimation device $1a$ is a device that estimates (measures) at least one of a differential group delay (DGD) in a frequency series or a time series and a polarization dependent loss (PDL) in a frequency series or a time series for an optical signal transmitted through an optical transmission path and a waveguide in an optical device.

For example, the waveguide estimation device $1a$ estimates at least one of the differential group delay in a frequency series or a time series and the polarization dependent loss in a frequency series or a time series by offline analyzing the result of the transmission experiment of the optical signal in the laboratory. For example, the waveguide estimation device $1a$ may estimate the differential group delay and the polarization dependent loss in real time while the laid digital coherent receiver and digital coherent receiver transmit optical signals.

The waveguide estimation device $1a$ executes time window processing on time-series tap coefficients (tap coefficients for each sample time) of the adaptive filter. That is, the waveguide estimation device $1a$ multiplies the time-series tap coefficients of the adaptive filter by the time window function. The waveguide estimation device $1a$ estimates the differential group delay and the polarization dependent loss based on the time-series tap coefficients within the time window.

Hereinafter, the time-series tap coefficients outside the time window may not be used in the differential group delay estimation processing and the polarization dependent loss estimation processing (may be simply ignored), or may be used in the differential group delay estimation processing and the polarization dependent loss estimation processing after being replaced with 0, for example.

The waveguide estimation device $1a$ includes an acquisition unit 10, a storage unit 11, a time window processing unit $12a$, a differential group delay estimation unit $13a$, a polarization dependent loss estimation unit 14, and an output unit 15.

The acquisition unit 10 acquires the time-series tap coefficients of the adaptive filter from, for example, a predetermined information processing device (not illustrated). The acquisition unit 10 outputs the time-series tap coefficients of the adaptive filter to the time window processing unit $12a$. The storage unit 11 stores a time window function.

The time window processing unit $12a$ (operation unit) multiplies the time-series tap coefficients of the adaptive filter by the time window function. The differential group delay estimation unit $13a$ (estimation unit) estimates the differential group delay based on the time-series tap coefficients within the time window as in Formula (2). The polarization dependent loss estimation unit 14 (estimation unit) estimates a polarization dependent loss as in Formula (3) based on time-series tap coefficients within a time window. The output unit 15 outputs each estimation result to a predetermined information processing device (not illustrated).

Next, the time window processing unit $12a$, the differential group delay estimation unit $13a$, and the polarization dependent loss estimation unit 14 will be described.

Figure 2:
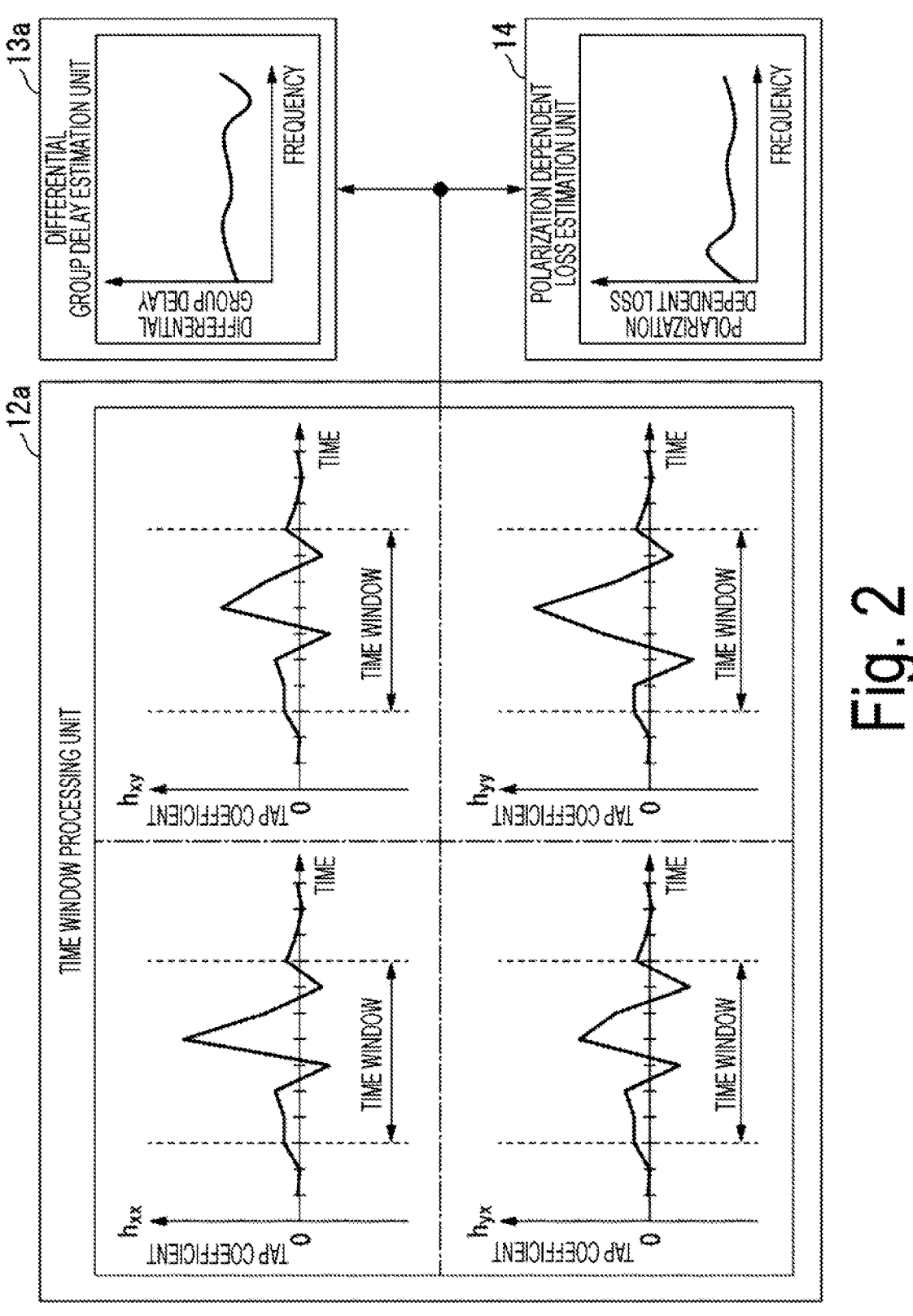
FIG. 2 is a diagram illustrating an example of time window processing, differential group delay estimation processing, and polarization dependent loss estimation processing according to the first embodiment.

FIG. 2 is a diagram illustrating an example of time window processing, differential group delay (DGD) estimation processing, and polarization dependent loss (PDL) estimation processing according to the first embodiment. In the time window processing unit $12a$ illustrated in FIG. 2, examples of the time-series tap coefficients "$h_{xx}$", "$h_{xy}$", "$h_{yx}$", and "$h_{yy}$" of the adaptive filter are illustrated. The differential group delay estimation unit $13a$ illustrated in FIG. 2 illustrates an example of a differential group delay (differential group delay for each frequency) in a frequency series. The polarization dependent loss estimation unit 14 illustrated in FIG. 2 illustrates an example of the polarization dependent loss (polarization dependent loss for each frequency) in a frequency series.

In FIG. 2, a time window centered on the peak time of the time-series tap coefficient (sample) is determined for each of the tap coefficients "$h_{xx}$", "$h_{xy}$", "$h_{yx}$", and "$h_{yy}$" of the adaptive filter. When the time-series tap coefficients in the time window are used for Fourier transform, the longer the length (width) of the time window, the better the frequency resolution of the differential group delay and the frequency resolution of the polarization dependent loss, respectively. As described above, the length of the time window and the frequency resolution are inversely proportional to each other.

However, when the frequency resolution is higher than necessary, the signal-to-noise ratio per point (sample) of the frequency series decreases. That is, when it is assumed that the noise of the tap coefficients is constant in the time direction, the signal-to-noise ratio per point of the frequency series decreases in proportion to the number of time-series tap coefficients in the time window.

Therefore, by appropriately selecting the number of tap coefficients used for the Fourier transform, it is possible to improve the signal-to-noise ratio of the differential group delay and the polarization dependent loss estimated using the frequency series signal. Here, the length of the time window centered on the peak time of the time-series tap coefficient may be determined empirically, for example.

As a result of determining the length of the time window, the position and the length of the time window in the time direction may be different for each element (tap coefficient) of the inverse matrix of the transfer function. In this case, the tap coefficients in the time domain having different positions and lengths may be used for the estimation processing after being replaced with 0.

Note that the time window processing unit $12a$ may multiply the time-series tap coefficients in the time window by a predetermined window function. As the predetermined window function, for example, an apodization function such as a "triangle function" or a "Happ-Genzel function" is used. As a result, it is possible to suppress ripple from occurring in the target spectrum.

Next, an operation example of the waveguide estimation device $1a$ will be described.

Figure 3:
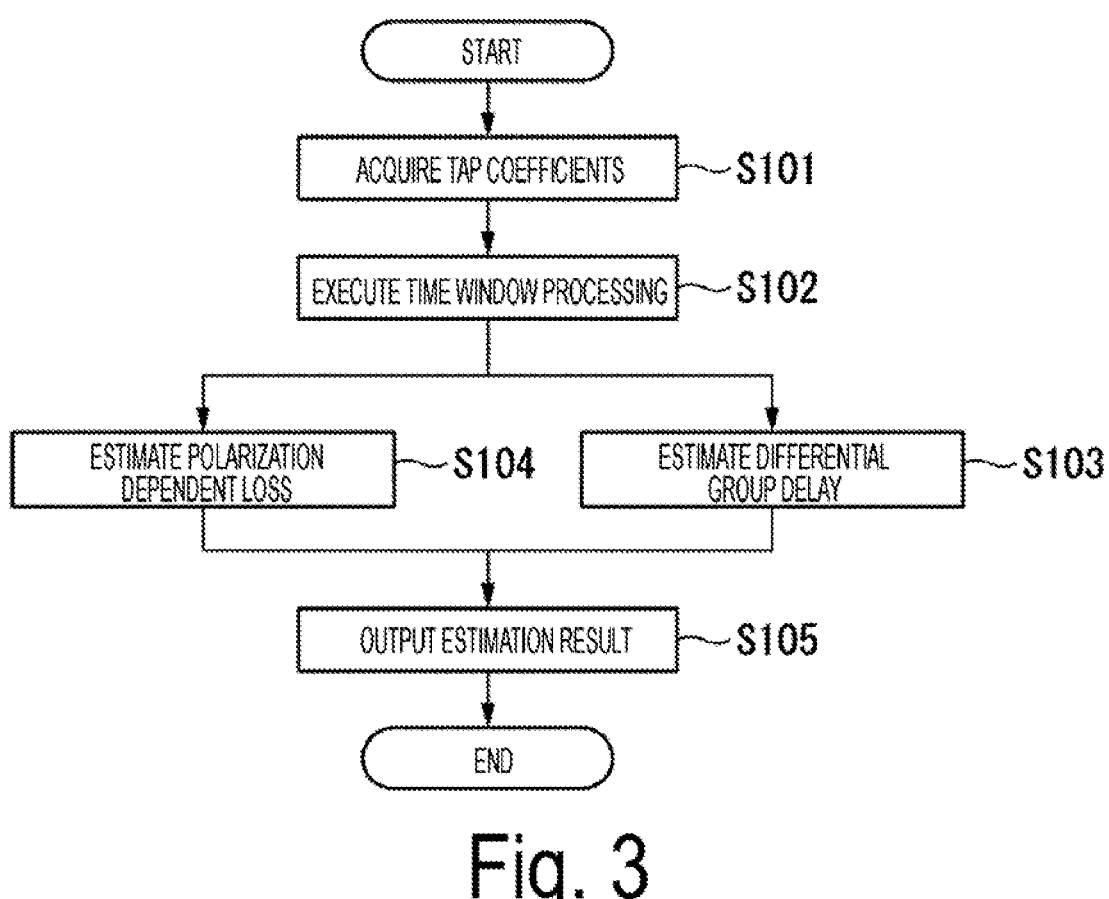
FIG. 3 is a flowchart illustrating an operation example of the waveguide estimation device according to the first embodiment.

FIG. 3 is a flowchart illustrating an operation example of the waveguide estimation device $1a$ in the first embodiment. The acquisition unit 10 acquires time-series tap coefficients (step 3101). The time window processing unit $12a$ executes time window processing on the time-series tap coefficients. That is, the time window processing unit $12a$ multiplies the time-series tap coefficients by the time window function (step S102).

The differential group delay estimation unit $13a$ estimates a differential group delay in the waveguide (system between the transmitter and the receiver) based on the time-series tap coefficients on which the time window processing has been executed (step 3103). The polarization dependent loss estimation unit 14 estimates the polarization dependent loss in the waveguide based on the time-series tap coefficients on which the time window processing has been executed (step 3104). The output unit 15 outputs each estimation result to a predetermined information processing device (not illustrated) (step S105).

As described above, the time window processing unit 12a (processor) multiplies the time-series tap coefficients of the adaptive filter by the time window function. The differential group delay estimation unit 13a (estimation unit) (estimator) estimates the differential group delay in a frequency series or a time series based on the time-series tap coefficients within the time window. The polarization dependent loss estimation unit 14 (estimation unit) may estimate the polarization dependent loss in a frequency series or a time series based on time-series tap coefficients within a time window.

In this manner, the differential group delay estimation unit 13a estimates the differential group delay in a frequency series or a time series based on the time-series tap coefficients within the time window. The differential group delay estimation unit 13a estimates the polarization dependent loss in a frequency series or a time series based on the time-series tap coefficients within the time window.

According to this, when the signal-to-noise ratio of the optical signal transmitted through the waveguide is less than the predetermined value, it is possible to improve the estimation accuracy of at least one of the differential group delay and the polarization dependent loss. Here, since dedicated hardware for estimating the differential group delay and the polarization dependent loss is unnecessary, the hardware of the digital coherent receiver does not need to be changed.

Modification Example of First Embodiment

In the modification example of the first embodiment, a difference from the first embodiment is that threshold processing is executed on the time-series tap coefficients. In the modification example of the first embodiment, differences from the first embodiment will be mainly described.

Figure 4:
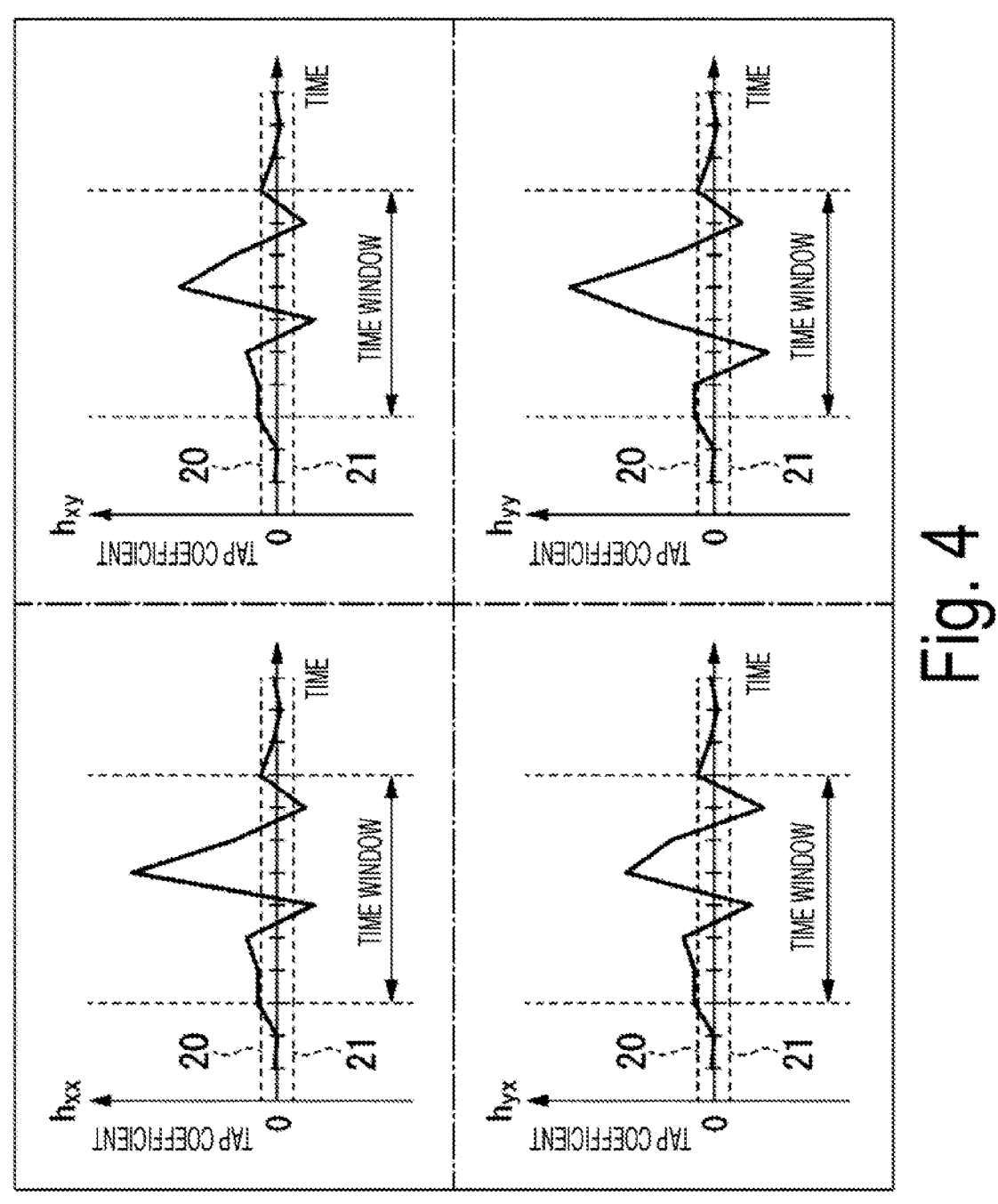
FIG. 4 is a diagram illustrating an example of threshold processing in a modification example of the first embodiment.

FIG. 4 is a diagram illustrating an example of threshold processing in a modification example of the first embodiment. In FIG. 4, examples of the time-series tap coefficients "$h_{xx}$", "$h_{xy}$", "$h_{yx}$", and "$h_{yy}$" of the adaptive filter are illustrated. In the time-series tap coefficients, a lower limit threshold value 20 and an upper limit threshold value 21 are determined based on a predetermined condition. The time window processing unit 12a executes threshold processing on the time-series tap coefficients (for example, the absolute value of the tap coefficient) using the lower limit threshold value 20 and the upper limit threshold value 21.

The differential group delay estimation unit 13a executes estimation processing including Fourier transform on the tap coefficient exceeding the lower limit threshold value 20 or falling below the upper limit threshold value 21 among time-series tap coefficients within the time window. The differential group delay estimation unit 13a may execute estimation processing including Fourier transform on the tap coefficient within a range from the lower limit threshold value 20 to the upper limit threshold value 21 and within a predetermined margin range among the time-series tap coefficients within the time window.

The differential group delay estimation unit 13a may execute estimation processing including Fourier transform on the tap coefficient exceeding the lower limit threshold value 20 or falling below the upper limit threshold value 21 among the time-series tap coefficients within the time window. The differential group delay estimation unit 13a estimates a differential group delay as in Formula (2) based on the result of the Fourier transform.

The polarization dependent loss estimation unit 14 executes estimation processing including Fourier transform on the tap coefficient exceeding the lower limit threshold value 20 or falling below the upper limit threshold value 21 among the time-series tap coefficients within the time window. The polarization dependent loss estimation unit 14 may execute estimation processing including Fourier transform on the tap coefficient within a range from the lower limit threshold value 20 to the upper limit threshold value 21 and within a predetermined margin range among the time-series tap coefficients within the time window.

The polarization dependent loss estimation unit 14 may execute estimation processing including Fourier transform on the tap coefficient exceeding the lower limit threshold value 20 or falling below the upper limit threshold value 21 among the time-series tap coefficients within the time window. The polarization dependent loss estimation unit 14 estimates the polarization dependent loss as in Formula (3) based on the result of the Fourier transform.

As described above, the differential group delay estimation unit 13a estimates the differential group delay in a frequency series or a time series based on the tap coefficient exceeding the lower limit threshold value or falling below the upper limit threshold value among the time-series tap coefficients in the time window. The polarization dependent loss estimation unit 14 may estimate the polarization dependent loss in a frequency series or a time series based on the tap coefficient exceeding the lower limit threshold value 20 or falling below the upper limit threshold value 21 among the time-series tap coefficients in the time window.

According to this, when the signal-to-noise ratio of the optical signal transmitted through the waveguide is less than the predetermined value, it is possible to improve the estimation accuracy of at least one of the differential group delay and the polarization dependent loss.

Second Embodiment

A second embodiment is different from the first embodiment in that the length of the time window is updated based on the average value of the differential group delays in a frequency series or a time series. In the second embodiment, differences from the first embodiment will be mainly described.

Figure 5:
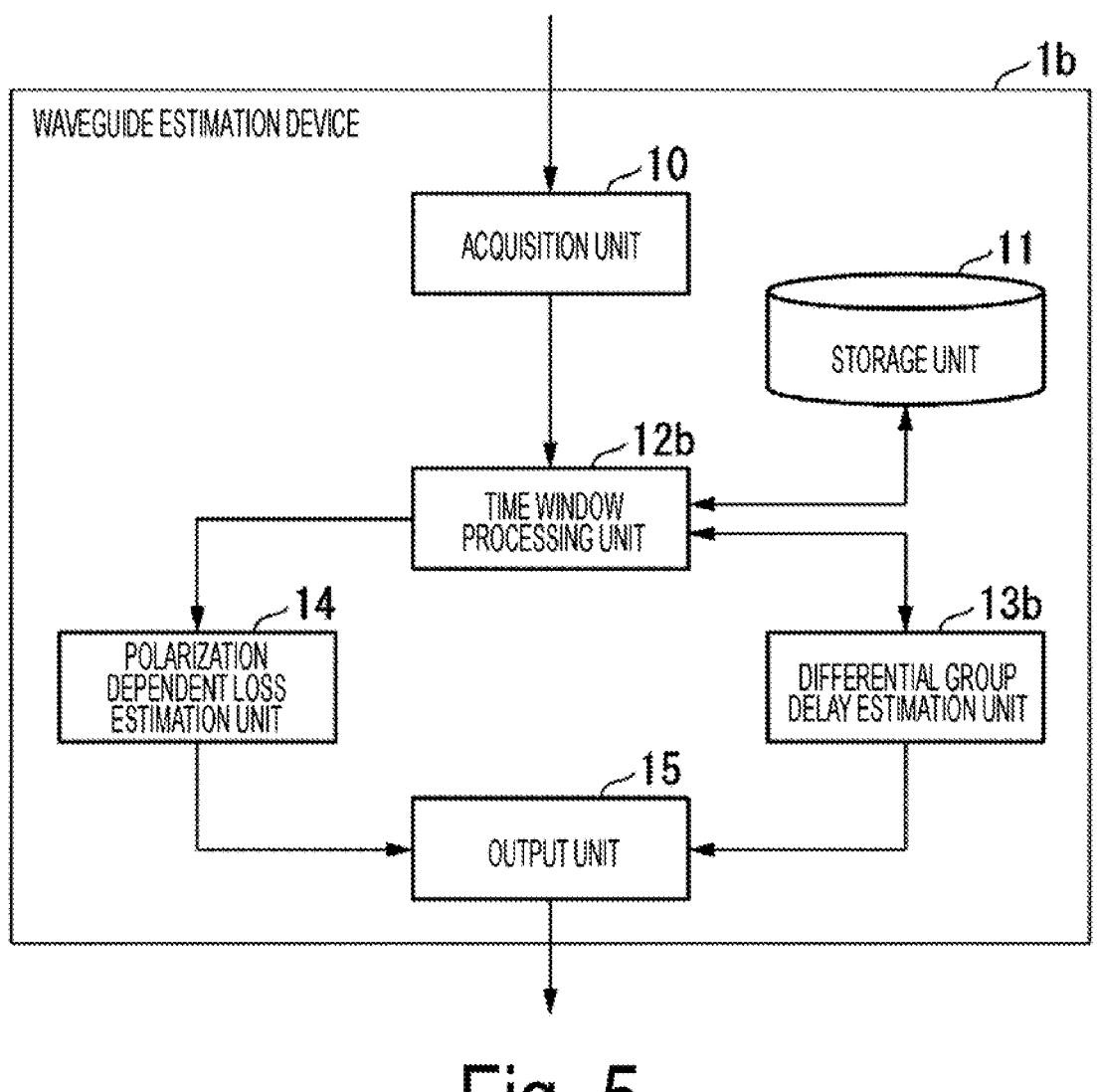
FIG. 5 is a diagram illustrating a configuration example of a waveguide estimation device according to a second embodiment.

FIG. 5 is a diagram illustrating a configuration example of a waveguide estimation device 1b according to a second embodiment. The waveguide estimation device 1b is a device that estimates (measures) at least one of the differential group delay (DGD) in a frequency series or a time series and the polarization dependent loss (PDL) in a frequency series or a time series for an optical signal transmitted through an optical transmission path and a waveguide in an optical device.

The waveguide estimation device 1b includes the acquisition unit 10, the storage unit 11, a time window processing unit 12b, a differential group delay estimation unit 13b, the polarization dependent loss estimation unit 14, and the output unit 15.

Figure 6:
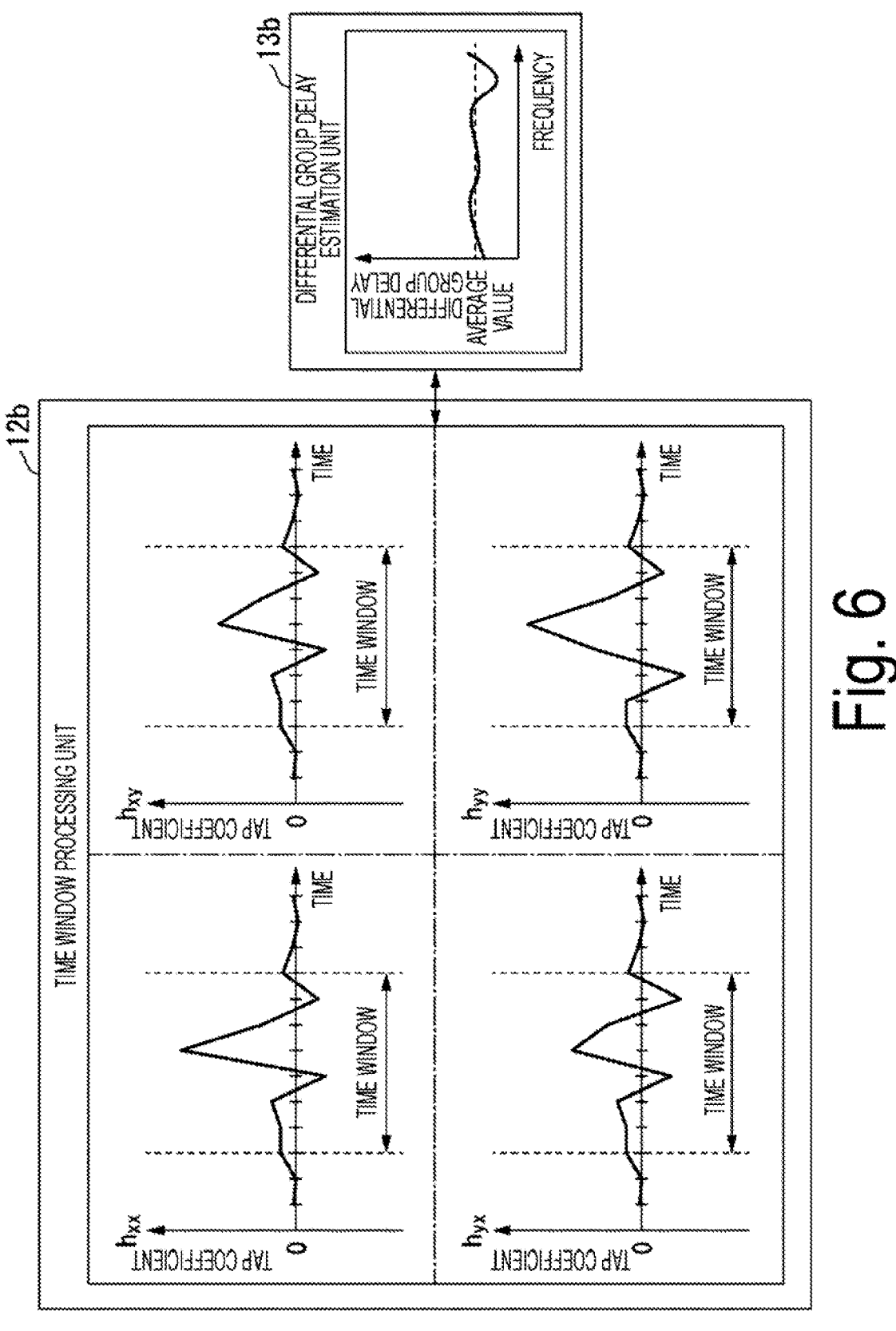
FIG. 6 is a diagram illustrating an example of time window processing and differential group delay estimation processing according to the second embodiment.

FIG. 6 is a diagram illustrating an example of time window processing and differential group delay estimation processing according to the second embodiment. The time window processing unit 12b derives the optimum length of the time window by updating the length of the time window based on the average value (frequency average) of the differential group delays in a frequency series. The time window processing unit. 12b derives the optimum length of the time window by updating the length of the time window based on the average value (frequency average) of the differential group delays in a time series. In the second embodiment, as an example, the length of the time window is a constant multiple of the average value of the differential group delays.

Next, the reason why it is possible to derive the optimum length of the time window based on the average value (frequency average) of the differential group delays will be described.

The length of the time window can be derived based on a spread (for example, full width at half maximum) of a peak in the power spectrum of the frequency spectrum of the differential group delay. Further, the length of the time window may be derived based on the spread of the peak in the power spectrum of the frequency spectrum of the polarization dependent loss. Each power spectrum is the square of the absolute value of the Fourier transform result of the frequency spectrum. Therefore, the unit of the horizontal axis of each power spectrum is time.

The Fourier transform result of the power spectrum matches the autocorrelation function. Therefore, the spread of the autocorrelation function and the spread of the peak of the power spectrum are inversely proportional to each other. Therefore, the optimal length of the time window can be derived based on the spread of the autocorrelation function of the frequency spectrum of the differential group delay. Furthermore, the optimum length of the time window may be derived based on the spread of the autocorrelation function of the frequency spectrum of the polarization dependent loss.

Each of the differential group delay and the polarization dependent loss is probabilistic. Here, the ideal probability distribution of the differential group delay and the ideal probability distribution of the polarization dependent loss have been clarified by the research of the related art. In addition, the autocorrelation function of the differential group delay and the autocorrelation function of the polarization dependent loss are uniquely determined by the research of the related art.

For each effect of the first-order differential group delay and the first-order polarization dependent loss, in a case where the waveguide (optical fiber) is considered to be a continuous limit of a minute birefringence substance, an autocorrelation function of the square of the differential group delay is expressed as Expression (4) (Reference Literature 1 (M. Shtaif and A. Mecozzi, "Study of the frequency autocorrelation of the differential group delay in fibers with polarization mode dispersion," Optics Letters, Vol. 25, pp. 707-709 (2000)).

[Math. 4]

$$\langle \tau^2 \rangle^2 + \frac{4\langle \tau^2 \rangle}{\Delta\omega^2} - \frac{12}{\Delta\omega^4}\left[1 - \exp\left(-\frac{\Delta\omega^2\langle \tau^2 \rangle}{3}\right)\right] \quad (4)$$

Here, "$\tau$" represents a differential group delay. "$\Delta\omega$" represents a deviation in the frequency direction from the center of the frequency. The full width at half maximum in the frequency direction is expressed by Formula (5).

[Math. 5]

$$\frac{5.6}{\sqrt{\langle \tau \rangle^2}} \quad (5)$$

Here, "<A>" represents an ensemble average of the random variables "A." The polarization dependent loss also has the same probability distribution (Reference Literature 2 (C. Antonelli, A. Mecozzi, L. E. Nelson, and P. Magill, "Autocorrelation of the polarization-dependent loss in fiber routes," Optics Letters, Vol. 36, pp. 4005-4007 (2011))).

For the power spectrum of the frequency spectrum of the differential group delay and the power spectrum of the frequency spectrum of the polarization dependent loss, the full width at half maximum in the frequency direction of each spectrum is determined not according to the polarization dependent loss but according to the average value (square root) of the differential group delay.

Therefore, the differential group delay estimation unit 13b temporarily estimates the average value (frequency average) of the differential group delays in a frequency series using all the taps of the adaptive filter. That is, the differential group delay estimation unit 13b temporarily estimates the average value of the differential group delays in a frequency series based on all the acquired tap coefficients. The time window processing unit 12b or the differential group delay estimation unit 13b determines a constant multiple of the estimated average value as the length of the time window. The time window processing unit 12b or the differential group delay estimation unit 13b may add a predetermined margin to the length of the time window.

Note that, in the ensemble average of the differential group delays, the smaller the average value of the differential group delays, the smaller the number of statistically independent samples (points) in the frequency direction. Therefore, the average value (frequency average) of the differential group delays estimated at a time may be significantly different from the ensemble average of the original differential group delays. In such a case, the time window processing unit 12b or the differential group delay estimation unit 13b may execute the time averaging processing on the time-series tap coefficients. As a result, the time window processing unit 12b or the differential group delay estimation unit 13b can improve the estimation accuracy of the differential group delay.

Next, an operation example of the waveguide estimation device 1b will be described.

Figure 7:
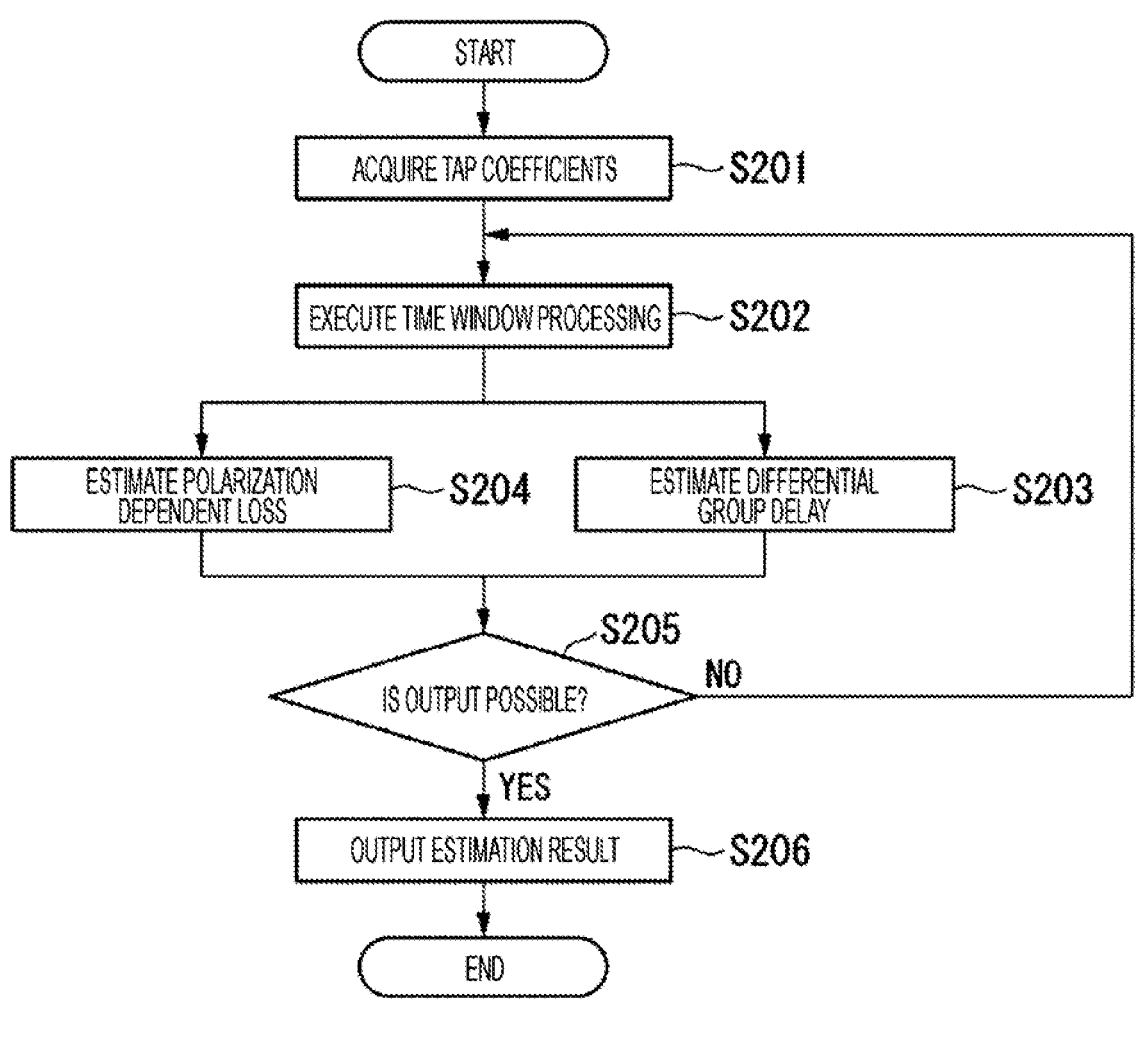
FIG. 7 is a flowchart illustrating an operation example of the waveguide estimation device according to the second embodiment.

FIG. 7 is a flowchart illustrating an operation example of the waveguide estimation device 1b in the second embodiment. Step S201 is similar to step S101 illustrated in FIG. 3. The time window processing unit 12b acquires the average value of the differential group delays from the differential group delay estimation unit 13a. The time window processing unit 12b multiplies the time-series tap coefficients by a time window function. Here, the time window processing unit 12b adjusts the length of the time window based on the average value of the differential group delays. For example, the time window processing unit 12b adjusts the length of the time window to be a constant multiple of the average value of the differential group delays (step S202).

The differential group delay estimation unit 13b estimates a differential group delay in the waveguide based on the time-series tap coefficients on which the time window processing has been executed. The differential group delay estimation unit 13b outputs the average value of the differential group delays to the time window processing unit 12b (step S203). The polarization dependent loss estimation unit 14 estimates the polarization dependent loss in the waveguide based on the time-series tap coefficients on which the time window processing has been executed. The polarization dependent loss estimation unit 14 may output the average value of the polarization dependent loss to the time window processing unit 12b (step S204).

The differential group delay estimation unit 13b or the polarization dependent loss estimation unit 14 determines whether or not it is possible to output the differential group delay estimation result and the polarization dependent loss estimation result. For example, when the number of times of executing step S203 is equal to or larger than a predetermined number of times, the differential group delay estimation unit 13b determines that the differential group delay estimation result and the polarization dependent loss estimation result can be output (step S205).

When it is determined that the differential group delay estimation result and the polarization dependent loss estimation result cannot be output. (step S205: NO), the differential group delay estimation unit 13b returns the processing to step S202. When it is determined that the differential group delay estimation result and the polarization dependent loss estimation result can be output (step S205: YES), the differential group delay estimation unit 13b and the polarization dependent loss estimation unit 14 proceed the processing to step S206. Step S206 is similar to step S105 illustrated in FIG. 3.

As described above, the differential group delay estimation unit 13b estimates the average value of the differential group delays in a frequency series or a time series. The time window processing unit 12b determines the length of the time window based on a constant multiple of the average value.

According to this, when the signal-to-noise ratio of the optical signal transmitted through the waveguide is less than the predetermined value, it is possible to improve the estimation accuracy of at least one of the differential group delay and the polarization dependent loss.

Third Embodiment

A third embodiment is different from the first embodiment in that the frequency window processing is executed on the differential group delay of the frequency series. In the third embodiment, differences from the first embodiment will be mainly described.

Figure 8:
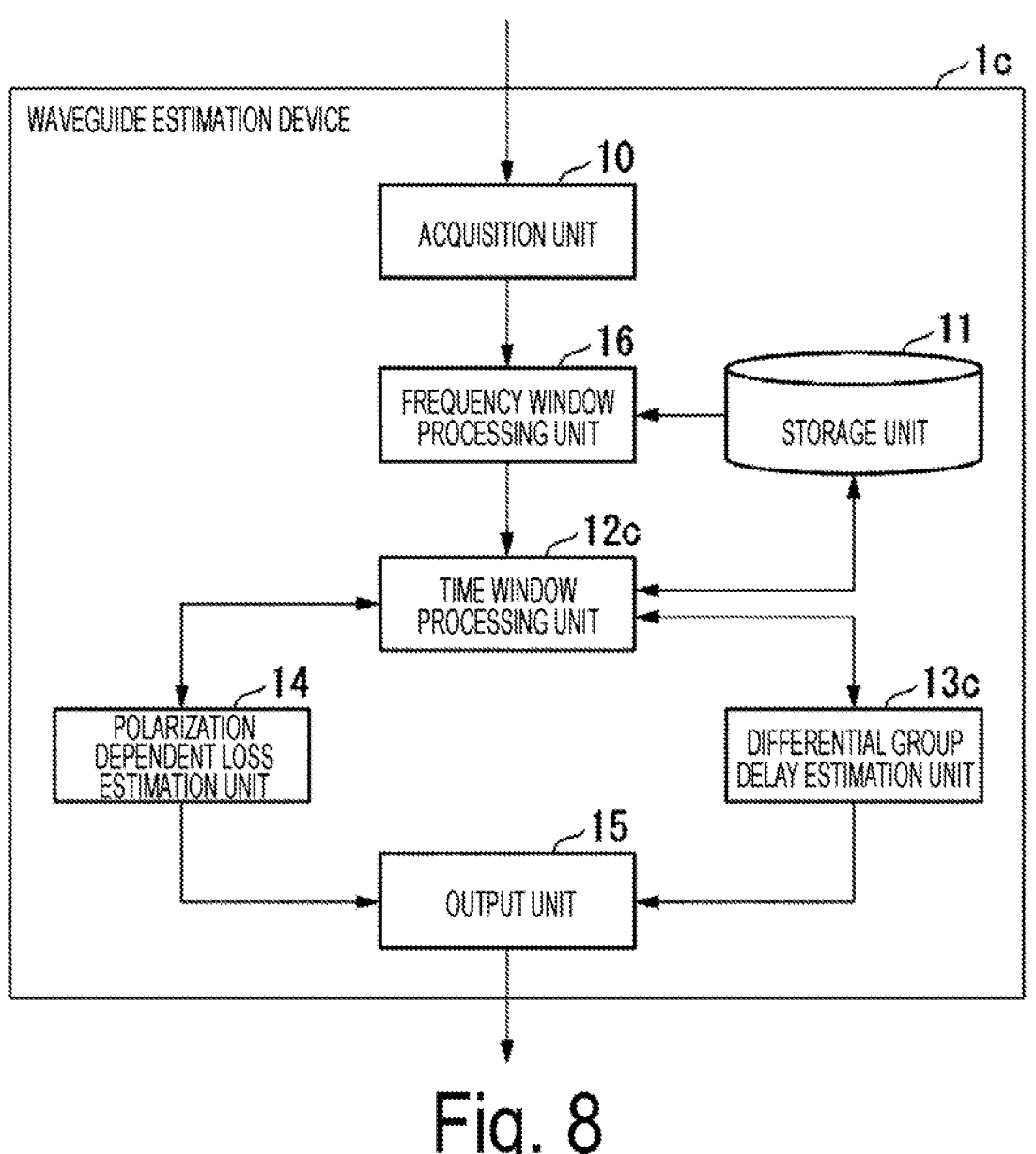
FIG. 8 is a diagram illustrating a configuration example of a waveguide estimation device according to a third embodiment.

FIG. 8 is a diagram illustrating a configuration example of a waveguide estimation device 1c according to a third embodiment. The waveguide estimation device 1c is a device that estimates (measures) at least one of the differential group delay (DGD) in a frequency series or a time series and the polarization dependent loss (PDL) in a frequency series or a time series for an optical signal transmitted through an optical transmission path and a waveguide in an optical device.

In digital coherent communication, a tap coefficient is determined empirically, for example, according to characteristics of a transmission path. Therefore, the peak of the time-series tap coefficient may spread for a predetermined time or more. In this case, the estimation accuracy of the differential group delay and the polarization dependent loss decreases.

Here, the waveguide estimation device 1c temporarily multiplies the time-series tap coefficients of the adaptive filter by the time window function. The waveguide estimation device 1c multiplies the frequency series used for the Fourier transform of the time-series tap coefficients by the frequency window function. In addition, the waveguide estimation device 1c derives a shorter time window length based on the result of the frequency window processing. Accordingly, it is possible to suppress a decrease in the estimation accuracy.

Hereinafter, the frequency series outside the frequency window may not be used in the processing of deriving the length of the time window (may be simply ignored), or may be used in the processing of deriving the length of the time window, after being replaced with 0, for example.

The waveguide estimation device 1c includes the acquisition unit 10, the storage unit 11, a time window processing unit 12c, a differential group delay estimation unit 13c, the polarization dependent loss estimation unit 14, the output unit 15, and a frequency window processing unit 16. The storage unit 11 stores a time window function and a frequency window function.

Figure 9:
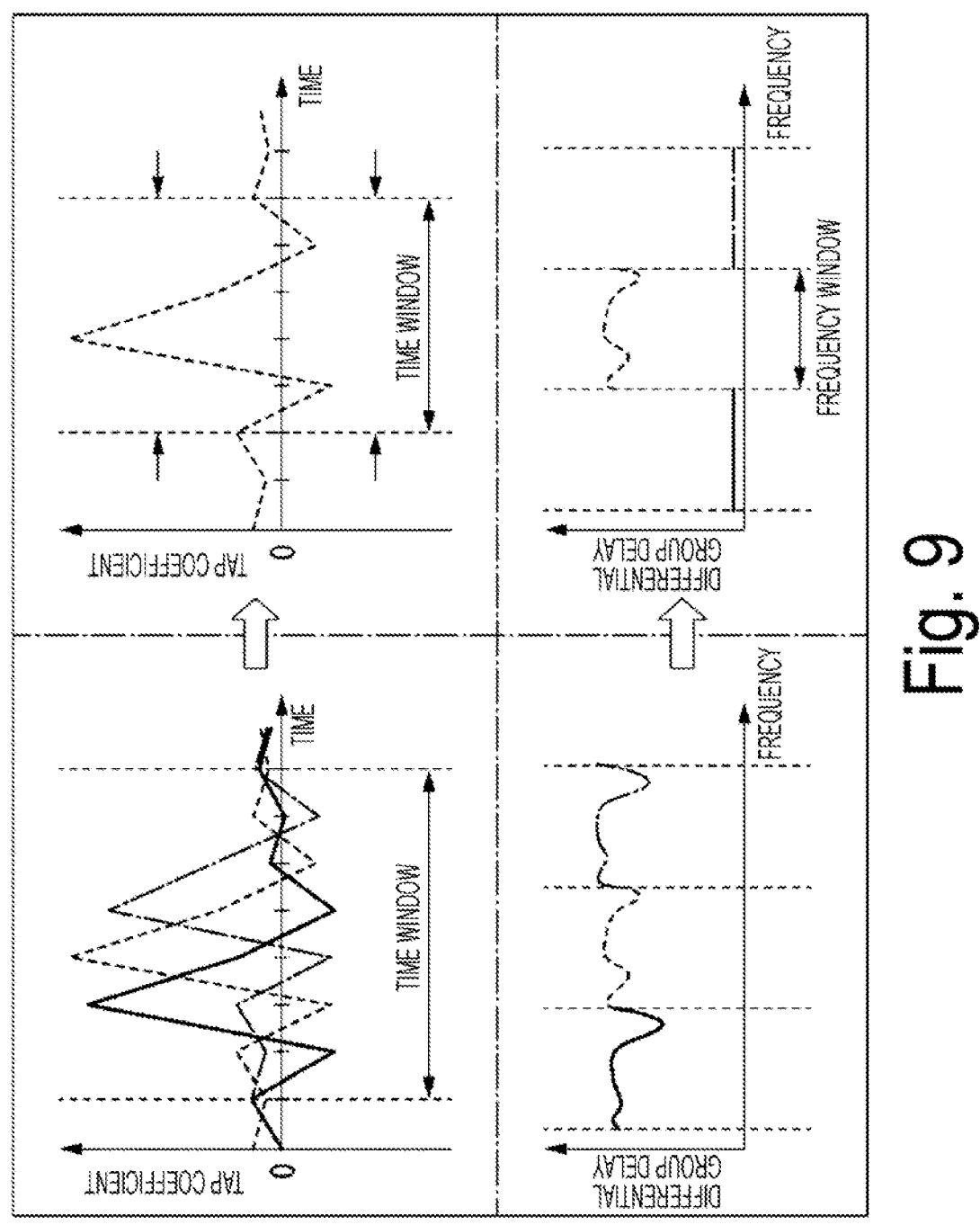
FIG. 9 is a diagram illustrating a first example of time window processing and frequency window processing according to the third embodiment.

FIG. 9 is a diagram illustrating a first example of time window processing and frequency window processing according to the third embodiment. For example, in a case where there is a high-order polarization mode dispersion in the waveguide (in a case where a change in the differential group delay varies depending on the frequency of the optical signal), in the waveform of the time-series tap coefficient, the peak time of the impulse response may vary for each frequency of the optical signal.

In such a case, the frequency window processing unit 16 multiplies the frequency series used for the Fourier transform of the tap coefficients by the frequency window function in a strip shape arranged in the frequency direction. That is, the frequency window processing unit 16 cuts out the frequency series for each frequency domain from all the frequency series. As a result, since the spread of the impulse response in the time direction can be narrowed, the length of the time window can be shortened.

Note that the frequency window processing unit 16 may multiply a frequency series cut out not to include a component having a frequency of 0 by a sine function in the time direction.

As a result, the frequency series cut out not to include the component having the frequency of 0 is down-converted into the frequency series including the component having the frequency of 0.

The time window processing unit 12c multiplies the time-series tap coefficients by the time window function for each frequency domain (frequency window) of the frequency window processing. The differential group delay estimation unit 13c estimates a differential group delay in the waveguide for each frequency domain (frequency window) of the frequency window processing based on the time-series tap coefficients on which the time window processing has been executed. The polarization dependent loss estimation unit 14 estimates a polarization dependent loss in the waveguide for each frequency domain (frequency window) of the frequency window processing based on the time-series tap coefficients on which the time window processing has been executed.

In this manner, by estimating the differential group delay and the polarization dependent loss for each frequency domain using a time window having a shortened length using a frequency window, the differential group delay and the polarization dependent loss can be estimated for a predetermined entire frequency domain.

Next, an operation example of the waveguide estimation device 1c will be described.

Figure 10:
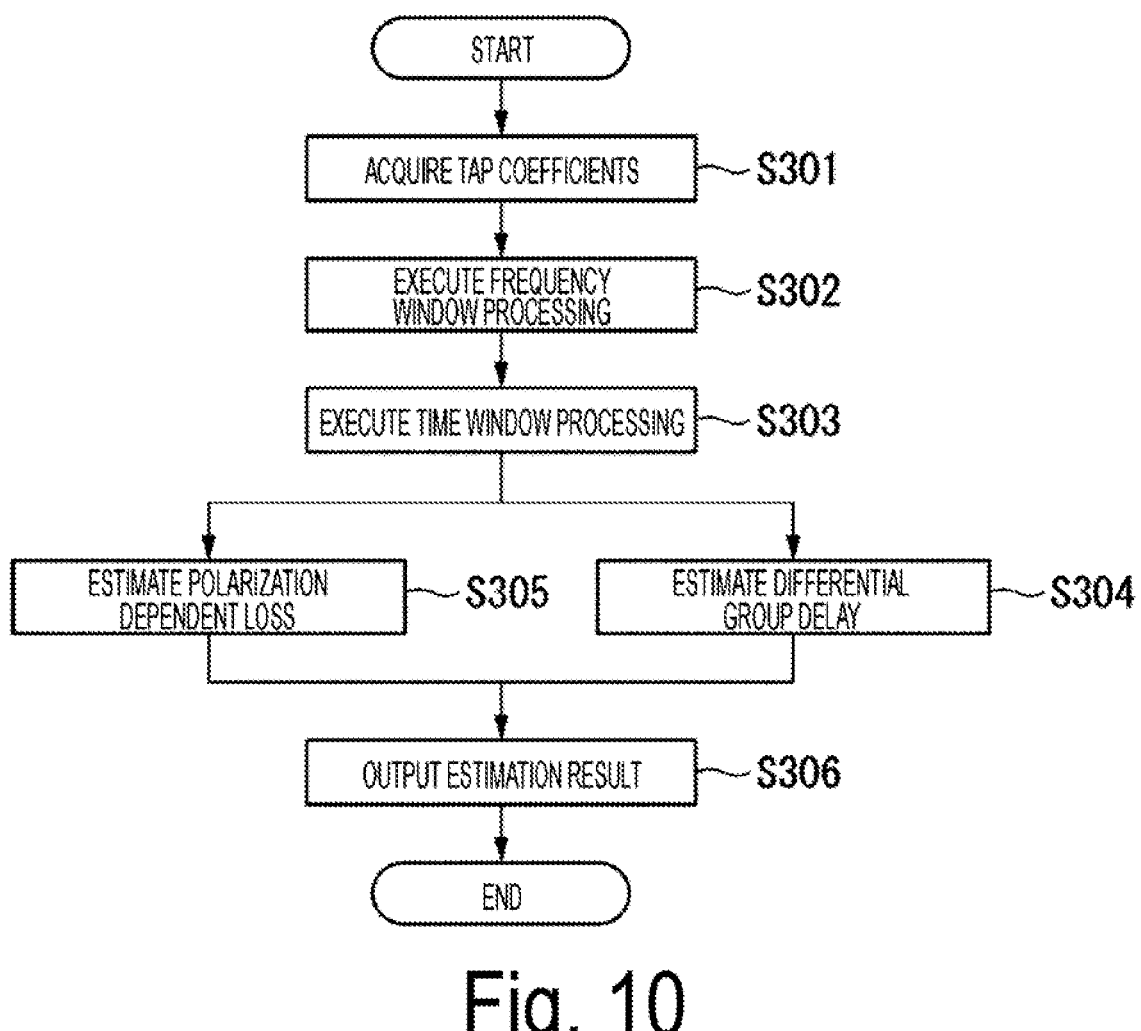
FIG. 10 is a flowchart illustrating an operation example of the waveguide estimation device according to the third embodiment.

FIG. 10 is a flowchart illustrating an operation example of the waveguide estimation device 1c in the third embodiment. Step S301 is similar to step S101 illustrated in FIG. 3. The frequency window processing unit 16 multiplies the frequency series used for the Fourier transform of the tap coefficients by the frequency window function in a strip shape arranged in the frequency direction (step S302).

The time window processing unit 12c multiplies the time-series tap coefficients by the time window function for each frequency domain of the frequency window processing (step 3303). The differential group delay estimation unit 13c estimates the differential group delay in the waveguide for each frequency domain of the frequency window processing based on the time-series tap coefficients on which the time window processing has been executed (step S304). The polarization dependent loss estimation unit 14 estimates the polarization dependent loss in the waveguide for each frequency domain of the frequency window processing based on the time-series tap coefficients on which the time window processing has been executed (step S305). Step S306 is similar to step S106 illustrated in FIG. 3.

As described above, the frequency window processing unit 16 cuts out the frequency series used for the Fourier transform of the tap coefficients for each frequency domain. The differential group delay estimation unit 13c estimates the differential group delay based on the time-series tap coefficients in the time window for each cut frequency series. The polarization dependent loss estimation unit 14 may estimate the polarization dependent loss based on the time-series tap coefficients in the time window for each cut frequency series.

According to this, when the signal-to-noise ratio of the optical signal transmitted through the waveguide is less than the predetermined value, it is possible to further improve the estimation accuracy of at least one of the differential group delay and the polarization dependent loss.

Modification Example of Third Embodiment

The modification example of the third embodiment is different from the third embodiment in that frequency window processing is executed on the frequency domains with small absolute values or differential group delays with small variation amounts. In the modification example of the third embodiment, differences from the third embodiment will be mainly described.

Figure 11:
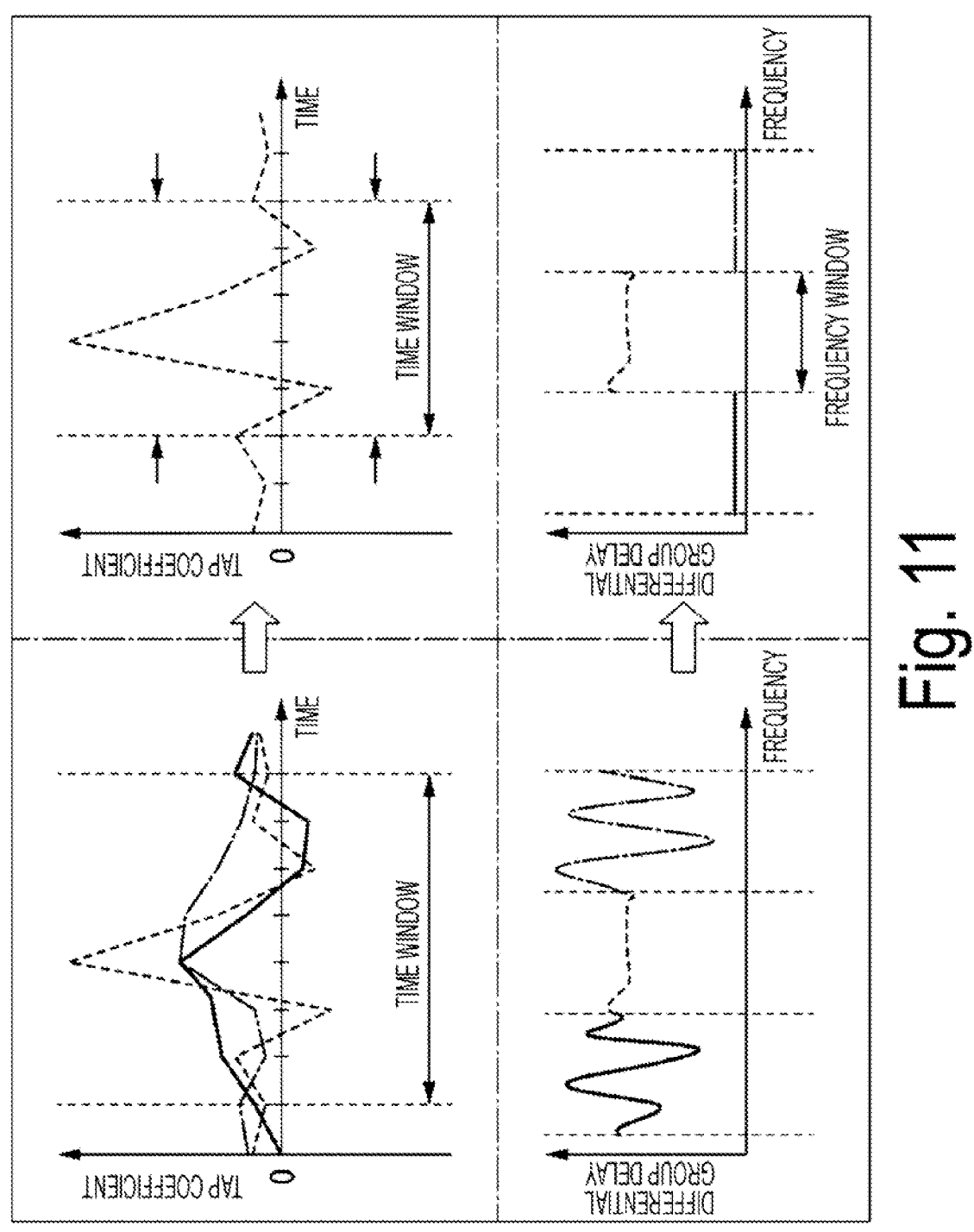
FIG. 11 is a diagram illustrating a second example of time window processing and frequency window processing according to a modification example of the third embodiment.

FIG. 11 is a diagram illustrating a second example of the time window processing and the frequency window processing according to the modification example of the third embodiment. The absolute value or the variation amount of the differential group delay may vary for each frequency domain. For example, there is a case where the absolute value of the differential group delay is small or the variation amount is small in some frequency domains due to the influence of the higher order polarization mode dispersion or as a probabilistic event.

In such a case, the frequency window processing unit 16 multiplies the frequency series used for the Fourier transform of the tap coefficients in the frequency domain having a small absolute value of the differential group delay or the frequency domain having a small variation amount by the frequency window function. That is, the frequency window processing unit 16 cuts out a frequency series in a frequency domain having a small absolute value of the differential group delay or a frequency domain having a small variation amount from all the frequency series. As a result, since the spread of the impulse response in the time direction can be narrowed, the length of the time window can be shortened.

The time window processing unit 12c multiplies the time-series tap coefficients by the time window function in a state where the frequency window processing is not executed. The differential group delay estimation unit 13c estimates a differential group delay in the waveguide based on the time-series tap coefficients on which the time window processing has been executed. The polarization dependent loss estimation unit 14 estimates the polarization dependent loss in the waveguide based on the time-series tap coefficients on which the time window processing has been executed.

The frequency window processing unit 16 multiplies the frequency series used for the Fourier transform of the tap coefficients in the frequency domain having a small absolute value of the differential group delay or the frequency domain having a small variation amount by the frequency window function. The frequency window processing unit 16 multiplies the frequency series used for the Fourier transform of the tap coefficients in the frequency domain having a small absolute value of the polarization dependent loss or the frequency domain having a small variation amount by the frequency window function.

The time window processing unit 12c multiplies the time-series tap coefficients by the time window function in a state where the frequency window processing is executed. The differential group delay estimation unit 13c estimates a differential group delay in the waveguide based on the time-series tap coefficients on which the time window processing has been executed. The polarization dependent loss estimation unit 14 estimates the polarization dependent loss in the waveguide based on the time-series tap coefficients on which the time window processing has been executed.

In this manner, by estimating the differential group delay and the frequency domain having a small absolute value of the polarization dependent loss or the frequency domain having a small variation amount for each frequency domain using a time window having a shortened length using a frequency window, the differential group delay and the polarization dependent loss can be estimated.

Next, an operation example of the waveguide estimation device 1c will be described.

Figure 12:
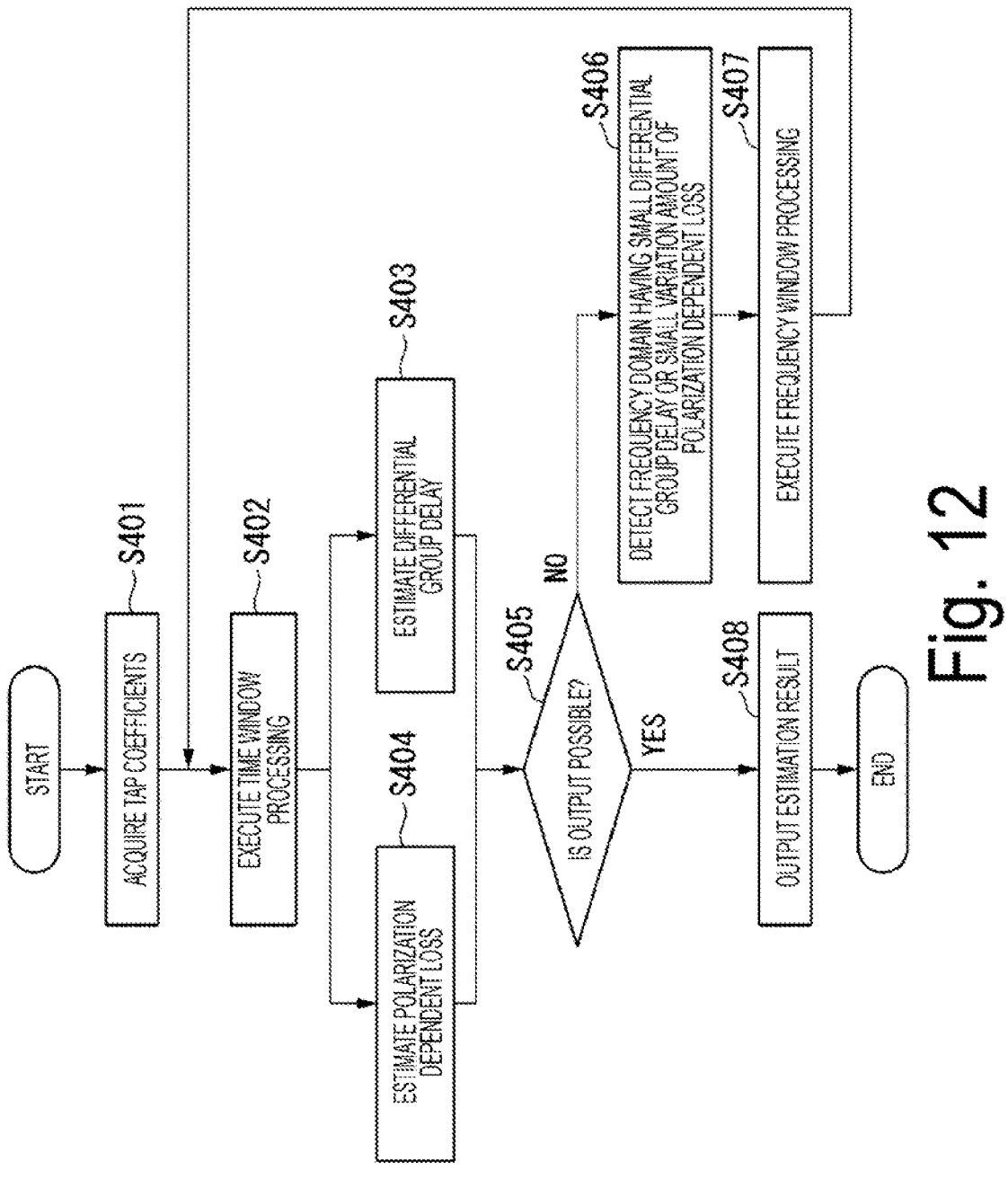
FIG. 12 is a flowchart illustrating an operation example of the waveguide estimation device according to a modification example of the third embodiment.

FIG. 12 is a flowchart illustrating an operation example of the waveguide estimation device 1c according to a modification example of the third embodiment. Each step from steps S401 to S405 is similar to each step from steps S201 to S205 illustrated in FIG. 7.

When it is determined that the estimation results of the differential group delay and the polarization dependent loss cannot be output (step S405: NO), the frequency window processing unit 16 detects a frequency domain having a small absolute value of the differential group delay or a frequency domain having a small variation amount (step S406). The frequency window processing unit 16 executes frequency window processing on a frequency series in a frequency domain having a small absolute value of the differential group delay or a frequency domain having a small variation amount. That is, the frequency window processing unit 16 multiplies the frequency series in the frequency domain having a small absolute value of the differential group delay or the frequency domain having a small variation amount by the frequency window function (step S407). The frequency window processing unit 16 returns the processing to step S402.

When it is determined that the differential group delay estimation result and the polarization dependent loss estimation result can be output (step S405: YES), the differential group delay estimation unit 13c and the polarization dependent loss estimation unit 14 proceed the processing to step S408. Step S206 is similar to step S206 illustrated in FIG. 7.

As described above, the frequency window processing unit 16 cuts out the frequency series used for the Fourier transform of the tap coefficients in the frequency domain having a small absolute value of the differential group delay or the frequency domain having a small variation amount. The differential group delay estimation unit 13*c* estimates the differential group delay based on the time-series tap coefficients in the time window for the cut frequency series. The polarization dependent loss estimation unit 14 may estimate the polarization dependent loss based on the time-series tap coefficients in the time window for the cut frequency series.

According to this, when the signal-to-noise ratio of the optical signal transmitted through the waveguide is less than the predetermined value, it is possible to further improve the estimation accuracy of at least one of the differential group delay and the polarization dependent loss.

The device of the present invention can also be implemented by a computer and a program, and the program can be recorded in a recording medium or provided through a network.

(Hardware Configuration Example)

Figure 13:
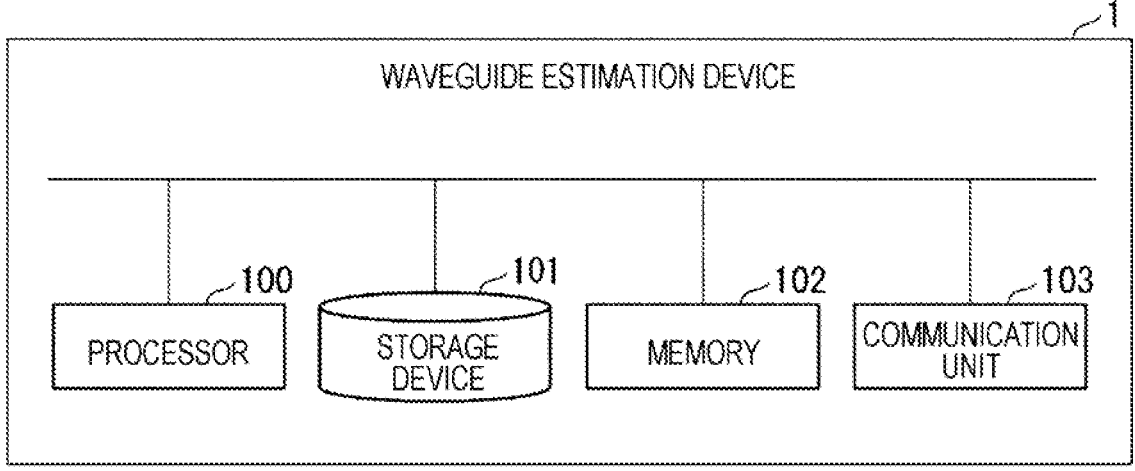
FIG. 13 is a diagram illustrating a hardware configuration example of the waveguide estimation device according to each embodiment.

FIG. 13 is a diagram illustrating a hardware configuration example of a waveguide estimation device 1 according to each embodiment. The waveguide estimation device 1 corresponds to each of the waveguide estimation device 1*a*, the waveguide estimation device 1*b*, and the waveguide estimation device 1*c*. Some or all of the functional units of the waveguide estimation device 1 are realized as software by causing a processor 100 such as a central processing unit (CPU) to execute a program stored in a storage device 101 including a non-volatile recording medium (non-transitory recording medium) and a memory 102. The program may be recorded on a computer-readable recording medium. The computer-readable recording medium is, for example, a portable medium such as a flexible disk, a magneto-optical disc, a read-only memory (ROM), or a compact disc read-only memory (CD-ROM), or a non-transitory recording medium such as a storage device such as a hard disk built in a computer system. A communication unit 103 acquires information such as a tap coefficient, a time window, and a frequency window. The communication unit 103 transmits the estimation result to a predetermined information processing device (not illustrated).

Some or all of the functional units of the waveguide estimation device 1 may be realized using hardware including an electronic circuit (electronic circuit or circuitry) in which, for example, a large scale integrated circuit (LSI), an application specific integrated circuit (ASIC), a programmable logic device (PLD), a field programmable gate array (FPGA), or the like is used.

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention is applicable to a digital coherent receiver.

REFERENCE SIGNS LIST

1*a*, 1*b*, 1*c* Waveguide estimation device
10 Acquisition unit
11 Storage unit
12*a*, 12*b*, 12*c* Time window processing unit
13*a*, 13*b*, 13*c* Differential group delay estimation unit

14 Polarization dependent loss estimation unit
15 Output unit
16 Frequency window processing unit
20 Lower limit threshold value
21 Upper limit threshold value
100 Processor
101 Storage device
102 Memory
103 Communication unit

The invention claimed is:

1. A waveguide estimation device comprising:
a time window processor that multiplies time-series tap coefficients of an adaptive filter by an apodization function; and
an estimator that estimates at least one of a differential group delay in a frequency series or a time series and a polarization dependent loss in a frequency series or a time series based on the time-series tap coefficients in a time window,
wherein the estimator estimates at least one of the differential group delay in a frequency series or a time series and the polarization dependent loss in a frequency series or a time series based on a tap coefficient exceeding a lower limit threshold value or falling below an upper limit threshold value among the time-series tap coefficients in the time window.

2. The waveguide estimation device according to claim 1, wherein
the estimator estimates an average value of differential group delays in a frequency series or a time series, and the time window processor determines a length of the time window based on a constant multiple of the average value.

3. The waveguide estimation device according to claim 1, further comprising a frequency window processor that cuts out a frequency series used for Fourier transform of the time-series tap coefficients for each frequency domain,
wherein the estimator estimates at least one of the differential group delay in a frequency series or a time series and the polarization dependent loss in a frequency series or a time series based on the time-series tap coefficients in the time window for each of the cut frequency series.

4. A non-transitory computer readable storing a program for causing a computer to function as the waveguide estimation device according to claim 1.

5. A waveguide estimation method executed by a waveguide estimation device, the method comprising:
a time window processing step of multiplying time-series tap coefficients of an adaptive filter by an apodization function; and
an estimation step of estimating at least one of a differential group delay in a frequency series or a time series and a polarization dependent loss in a frequency series or a time series based on the time-series tap coefficients in a time window,
wherein the estimation step further includes a step of estimating at least one of the differential group delay in a frequency series or a time series and the polarization dependent loss in a frequency series or a time series based on a tap coefficient exceeding a lower limit threshold value or falling below an upper limit threshold value among the time-series tap coefficients in the time window.

6. The waveguide estimation method according to claim 5, wherein the estimation step further includes a step of estimating an average value of differential group delays in a frequency series or a time series, and the time window processing step further includes a step of determining a length of the time window based on a constant multiple of the average value.

* * * * *